(12) United States Patent
Lindman

(10) Patent No.: US 10,227,116 B2
(45) Date of Patent: Mar. 12, 2019

(54) TRANSCEIVER DEVICES AND RELATED COMMUNICATION AND NAVIGATION METHODS

(71) Applicant: Suunto Oy, Vantaa (FI)

(72) Inventor: Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 10 days.

(21) Appl. No.: 15/386,107

(22) Filed: Dec. 21, 2016

(65) Prior Publication Data

US 2017/0183068 A1    Jun. 29, 2017

(30) Foreign Application Priority Data

Dec. 29, 2015 (FI) .................................. 20156014
Dec. 29, 2015 (GB) ................................. 1523036.0

(51) Int. Cl.
*B63C 11/22* (2006.01)
*B63C 11/26* (2006.01)
(Continued)

(52) U.S. Cl.
CPC ............. *B63C 11/26* (2013.01); *B63C 11/22* (2013.01); *G01S 3/782* (2013.01); *G01S 5/0226* (2013.01);
(Continued)

(58) Field of Classification Search
CPC ................................ B63C 11/26; H04B 11/00
(Continued)

(56) References Cited

U.S. PATENT DOCUMENTS 5,185,725 A    2/1993   Kent et al.
5,331,602 A *  7/1994   McLaren .............. G01S 5/0009
                                                  367/127
(Continued)

FOREIGN PATENT DOCUMENTS

FI          20135911 A      3/2015
WO     WO 201555894 A1     4/2015

*Primary Examiner* — Albert K Wong
(74) *Attorney, Agent, or Firm* — Seppo Laine Oy

(57) ABSTRACT

A system and a method, as well as a positioning and wearable devices for determining the distance and position of devices communicating with each other over a medium, the system, are disclosed. At least one remote device comprises first processing unit, at least one transmitter functionally connected to the first processing unit and adapted to transmit signals over a medium, and at least one receiver functionally connected to the first processing unit and adapted to receive signals over said medium. At least two wearable devices, each comprising a second processing unit and wireless communication means capable of receiving and sending data signals over said medium, are also provided. The remote device is adapted to determine the distance to at least two wearable devices, to determine the direction to said at least two wearable devices based on at least two different bearings taken from said at least one remote device to each wearable device, to calculate the position of said at least two wearable devices relative to the remote device, and to communicate the position of at least one first wearable device to a second wearable device. The wearable devices are adapted to process the position of a first wearable device in their processing unit and to present to the user of a second wearable device an indication of direction and distance to said first wearable device.

28 Claims, 5 Drawing Sheets

Figure 1:
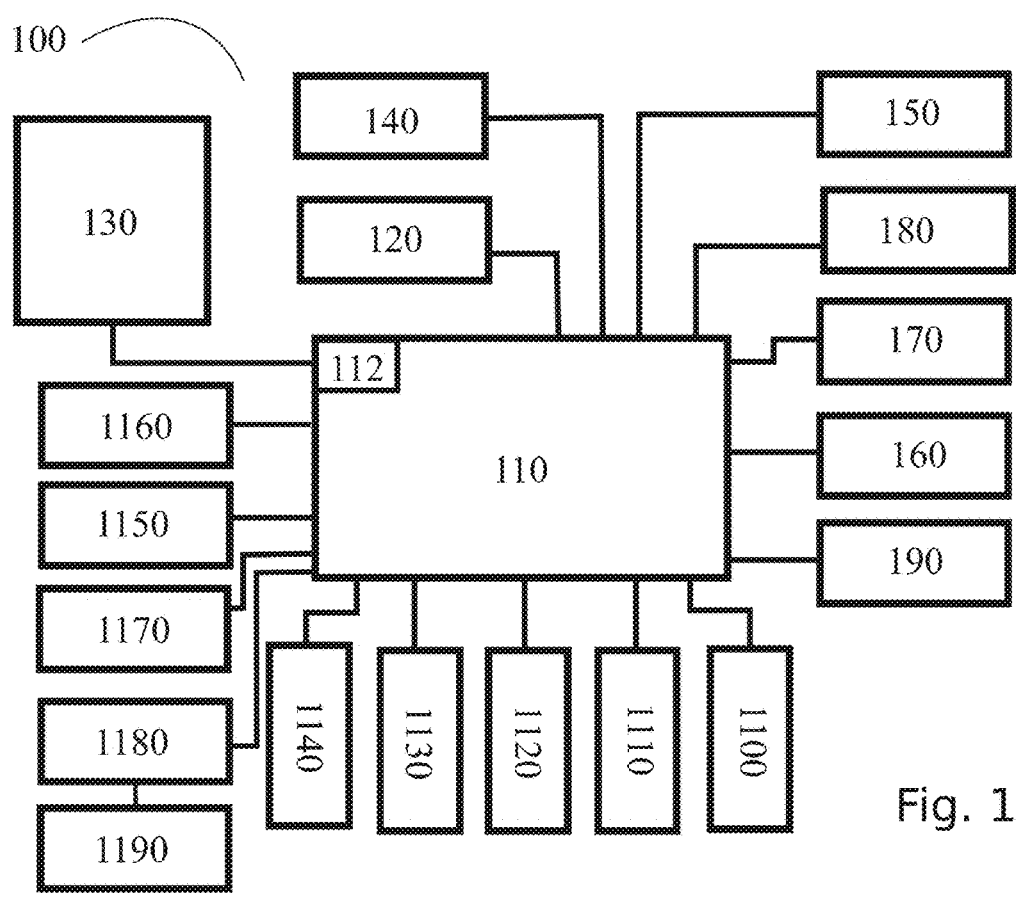

(51) Int. Cl.
  *G01S 3/782* (2006.01)
  *G01S 5/02* (2010.01)
  *H01Q 1/27* (2006.01)
  *H04L 29/08* (2006.01)
  *H04W 84/18* (2009.01)
  *B63C 11/02* (2006.01)

(52) U.S. Cl.
  CPC ....... *H01Q 1/273* (2013.01); *H04L 29/08306* (2013.01); *H04W 84/18* (2013.01); *B63C 2011/021* (2013.01)

(58) Field of Classification Search
  USPC .............. 701/408, 468, 21; 367/131, 134, 6; 340/573.1, 539.1
  See application file for complete search history.

(56) References Cited

U.S. PATENT DOCUMENTS

| | | | |
|---|---|---|---|
| 6,108,272 A | 8/2000 | Fox | |
| 7,362,655 B1* | 4/2008 | Hester | G01S 5/06 367/124 |
| 7,650,208 B2 | 1/2010 | Basilico | |
| RE42,218 E | 3/2011 | Magine et al. | |
| 8,275,311 B2 | 9/2012 | Lindman | |
| 9,606,220 B2* | 3/2017 | Berumen | A01K 11/006 |
| 9,791,538 B2* | 10/2017 | O'Mahony | G01S 5/0036 |
| 2002/0109601 A1 | 8/2002 | Arens | |
| 2002/0198659 A1 | 12/2002 | Doyle et al. | |
| 2005/0219950 A1* | 10/2005 | Rowe | G01S 5/0226 367/118 |
| 2006/0196499 A1* | 9/2006 | Cannizzaro | B63C 11/26 128/200.14 |
| 2006/0293806 A1 | 12/2006 | Basilico | |
| 2007/0140057 A1* | 6/2007 | Webb | B63C 11/26 367/118 |
| 2008/0062816 A1 | 3/2008 | Leal et al. | |
| 2008/0102855 A1 | 5/2008 | Forbes et al. | |
| 2008/0198695 A1* | 8/2008 | Abdi | H04B 11/00 367/134 |
| 2010/0299073 A1* | 11/2010 | Metzler | B63C 11/02 702/19 |
| 2011/0038230 A1* | 2/2011 | Napolitano | G01S 1/80 367/127 |
| 2014/0048069 A1 | 2/2014 | Fattah | |
| 2015/0284062 A1 | 10/2015 | Brodin | |

* cited by examiner

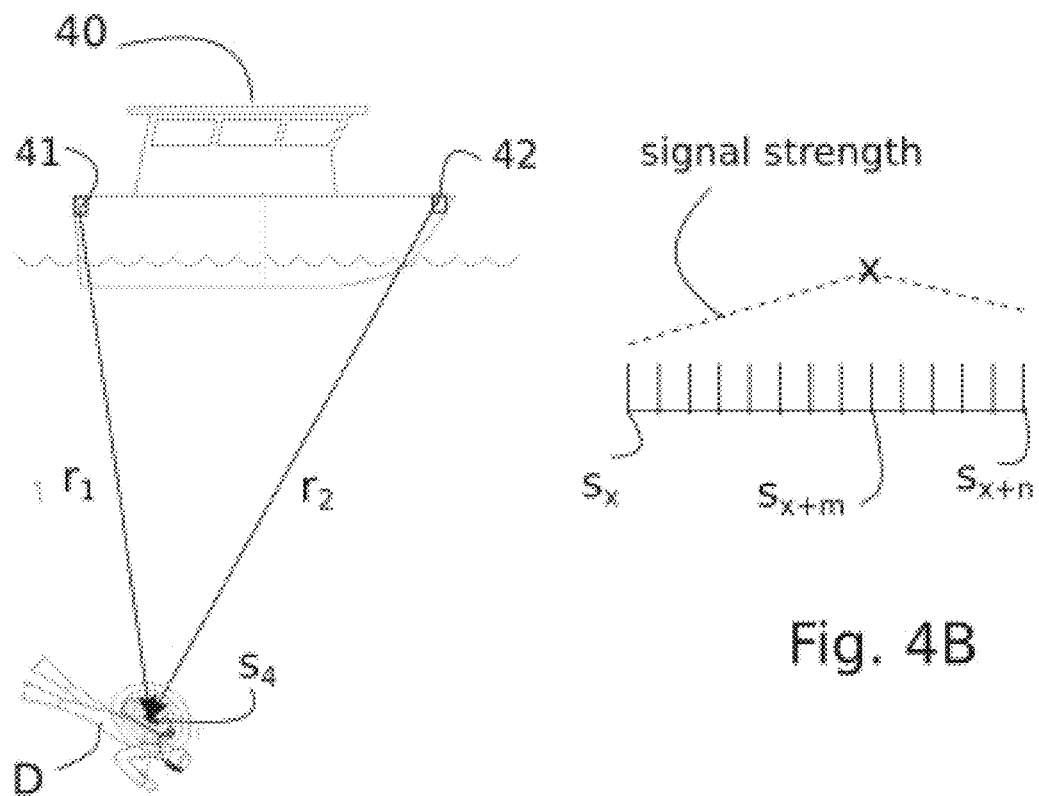
Fig. 4A
Fig. 4B
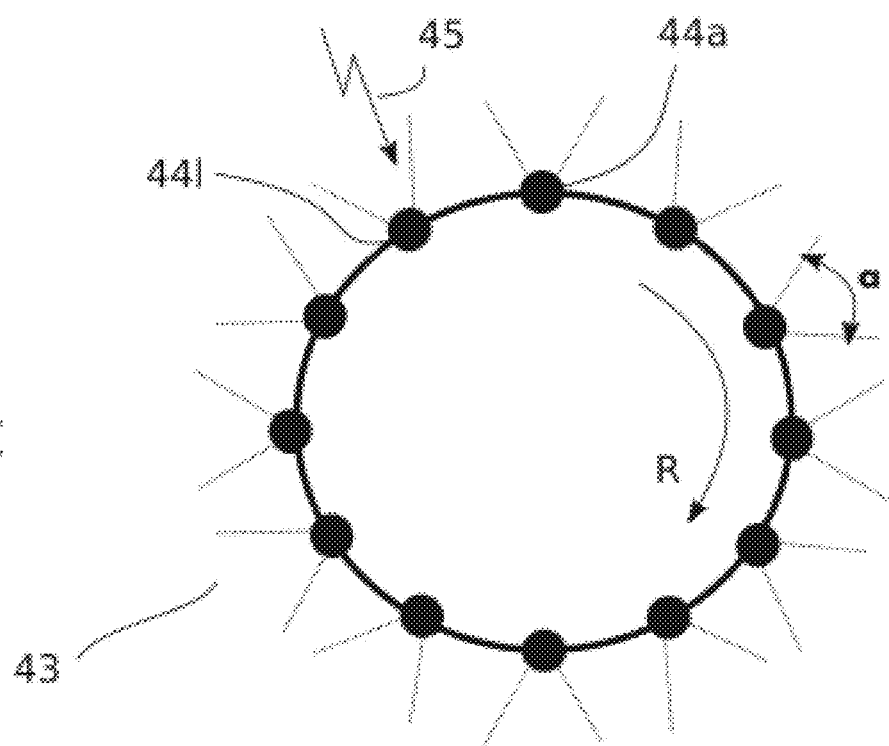
Fig. 4C

TRANSCEIVER DEVICES AND RELATED COMMUNICATION AND NAVIGATION METHODS

FIELD OF THE INVENTION

The invention relates to communication between electronic devices and to methods and communication systems for navigation. More specifically, the invention relates to underwater acoustic communication systems capable of providing positioning of divers, and to radio communication systems capable of providing positioning of individuals on a common playground.

BACKGROUND OF THE INVENTION

Diving computers are commonly used by divers to monitor key parameters, such as remaining air, present depth, compass (direction), etc. Divers rely on their diving computers and usually turn to the surface when there is a certain air pressure left in the tank, such as 50-100 bar. In modern systems, pressure information may be sent wirelessly from a tank sensor unit to the diving computer using electromagnetic induction or other near-field communication systems that are operable at short distances under water. U.S. Pat. No. 8,275,311, U.S. Pat. No. 7,650,208, U.S. Pat. No. RE42218 and FI 20135911 disclose underwater transceiver systems of this kind.

Despite advanced personal equipment, scuba diving accidents occur. The most common triggers for these are insufficient gas, entrapment and equipment problems. It is thus clear that there is not only important to monitor one's own key parameters when diving, but it would serve an important purpose to monitor the key parameters of all participating divers, to prevent accidents from happening.

It is well known that the most favorable method of wireless underwater communication is done by acoustic means. Sound travels extremely well underwater, and can be encoded to contain data. Scuba divers are sometimes seen using full face masks equipped with wireless voice communication systems. These communication systems rely on ultrasonic sound waves to transfer encoded voice from one diver to another, or to a receiving station on the surface. Unfortunately, existing ultrasonic communication systems are typically bulky and expensive.

In US2014048069 is provided a method for monitoring a group of divers with a plurality of transmitter devices, each transmitter device being connected to receive a tank pressure from a regulator a diver. The transmitter device generates on/off-modulated sonic data packets, comprising e.g. an identification portion and a pressure indicating portion. A receiver device will then receive the sonic data packets. Additionally, the direction to the source may be calculated and displayed by means of calculating the phase shift between the signals received on various transducers in the receiver device. This provides for a bilateral point-to-point indication between two transducers, and provides thus no communication for overall positioning of a group of divers. In fact, the simple modulation technique used will result in that multiple user communication will frequently cause collisions between data packets, effectively corrupting them.

In WO 2014/075860 is described a solution for determining the absolute position of a diver. The system has a diving base with a GPS receiver and an underwater acoustic modern configured to retransmit GPS coordinates under water. Combining retransmitted GPS coordinates with a calculated direction and distance to the base unit provides the diver with his or her absolute position. The diver equipment has several microphones to detect the direction to the base, and a pairing of the base and diver equipment is made to make it possible to calculate the distance between the equipment. This system also supports sharing of position and other data between paired divers via the (unmanned) base. The underwater network is based on a time-division multiplex scheme, which is sensitive to multipath propagation and allows for only slow data rates, in a situation which requires a lot of GPS information signaling between the various devices. In addition, as the position calculation is done by each diver's equipment and sent via the base unit, position calculation errors will accumulate in the relative position between two divers.

Generally speaking, underwater transmission of sound requires relatively high voltages to achieve acceptable ranges. To achieve the required change of several hundred meters, a transducer such as a typical ring transducer must be excited by a square wave of between 100V and 200V. Even higher voltages are possible (300-1000V) and will increase the range further, at the cost of reduced battery life. Generating such a high voltage from a small battery is complicated, and requires a large inductor and one or more large capacitors. Fitting pressure transducers, electronic circuit boards, batteries and large inductors and capacitors into a small housing in a diver's equipment is a major challenge. Therefore, there is a need for simple devices that can be kept small and have a low energy consumption. There is also a need for improved communication systems and devices in particular for positioning the individuals in a team.

SUMMARY OF THE INVENTION

According to one aspect to the invention, a system for determining the distance to and position of devices communicating with each other over a medium is provided. The inventive system, comprises:

at least one remote device comprising a first processing unit, at least one transmitter functionally connected to the first processing unit and adapted to transmit signals over a medium, and at least one receiver functionally connected to the first processing unit and adapted to receive signals over said medium, at least two wearable devices, each comprising a second processing unit and a wireless communication means capable of receiving and sending data signals over said medium, wherein said remote device is adapted to:
  determine the distance to at least two wearable devices,
  determine the direction to said at least two wearable devices based on at least two different bearings taken from said at least one remote device to each wearable device,
  calculate the position of said at least two wearable devices relative to the remote device;
  communicate the position of at least one first wearable device to a second wearable device;
said second wearable device being adapted to
  process the position of said first wearable device in said second processing unit present to the user of said second wearable device an indication of direction and distance to said first wearable device.

According to some embodiments of the invention, the remote device is adapted to store the time when sending a data signal over said medium and to determine the distance to the wearable devices based on the time of travel of signals between the devices.

According to some embodiments of the invention, the remote device is adapted to send a data signal over said medium to said wearable devices and to determine the distance to the wearable devices based on the signal strength of the response signals received from the wearable devices.

According to further embodiments, the remote device is adapted to determine the direction to the wearable devices based on the intersection point of at least two different bearings taken from the remote device to each wearable device. Alternatively, in other embodiments, the remote device is adapted to determine the direction to the wearable devices based on at least two different bearings to each wearable device taken by at least two receivers functionally coupled to the processing unit of the remote device.

The receivers may be at least two, are spaced apart from each other, and being signal direction sensitive. Alternatively, at least one receiver may comprise a rotating direction sensitive sensor.

According to the invention, a data signal transmitted from the remote device to a wearable device may comprise an identification code, by which a wearable device identifies itself as the recipient of the data signal. Likewise, a data signal transmitted from said wearable device to said remote device may comprise an ID code by which a wearable device identifies itself as the transmitter of said data signal. Such a code may consist of a predetermined time delay that must pass between receiving data and sending a response.

According to the invention, signals transmitted from the remote device to a plurality of wearable devices comprise data on the position of the wearable devices, whereby each of the plurality of wearable devices is configured to calculate and display the direction and distance to any other wearable device.

According to a second aspect of the invention, a method for determining the distance to and position of devices communicating with each other over a medium is provided, comprising the steps of:

providing a at least one remote device and at least two wearable devices, each device comprising a processing unit and wireless communication means functionally adapted to transmit and receive signals over said medium, the method comprising in said remote device the steps of:
 determining the distance to at least two wearable devices,
 determining the direction to said at least two wearable devices based on at least two different bearings taken from said at least one remote device to each wearable device,
 calculating the position of said at least two wearable devices relative to the remote device;
 communicating the position of at least one first wearable device to a second wearable device; and
a further step in said second wearable device of:
processing the position of said first wearable device in said second wearable device in order to obtain and present to the user of said second wearable device an indication of direction and distance to said first wearable device.

According to a third aspect of the invention, a positioning device for determining the distance to and position of two or more wearable devices communicating with said positioning device and each other over a medium is provided, the positioning device comprising a processing unit, at least one transmitter functionally connected to said processing unit and adapted to transmit signals over a medium, at least one receiver functionally connected to said processing unit and adapted to receive signals over said medium, and a memory unit for storing data. The processing unit is configured to determine the distance to said wearable devices and to determine the direction to the wearable devices based on at least two different bearings taken from said positioning device to each of the wearable devices. It also calculates the position of the wearable devices relative to the positioning device; and the positioning device is configured to communicate the position of at least a first device of said wearable devices to at least a second device of said wearable devices.

The processing unit in the positioning device may be configured to store in said memory unit the time when a data signal sent over a medium, to receive a return signal sent from the wearable devices in response to the data signal and to register the time of arrival of the response. It is then capable of determining the distance to the wearable devices based on the time of travel of signals between the positioning device and each of the wearable devices.

Alternatively, the processing unit may be configured to store in its memory unit, as a given parameter, the transmitting power of the transmitters of the wearable devices, and to determine the distance to the wearable devices based on the signal strength of the response signals received from them.

According to a fourth aspect of the invention, a wearable device is provided which comprises a processing unit and a wireless transceiver unit, and which is adapted for communication with a remote positioning device and at least one other wearable device over a medium, wherein the transceiver unit is configured to receive data signals from the remote positioning device and respond to them, and said processing unit is further configured to process position data of the positioning device and/or at least one other wearable device received from the positioning device, and to present to the user of the device an indication of direction and distance to the positioning device or the other wearable device.

The various advantageous embodiments of the invention are characterized by what is said in the appended claims.

SHORT DESCRIPTION OF THE DRAWINGS

Figure 2:
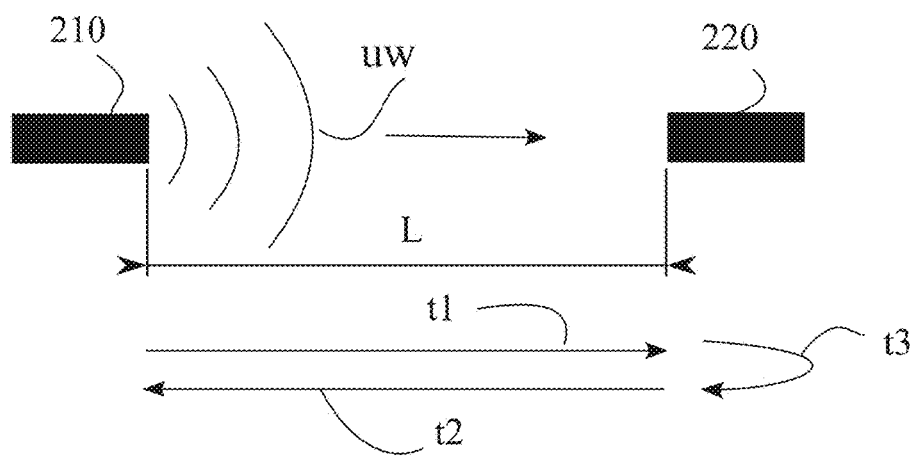
Figure 3:
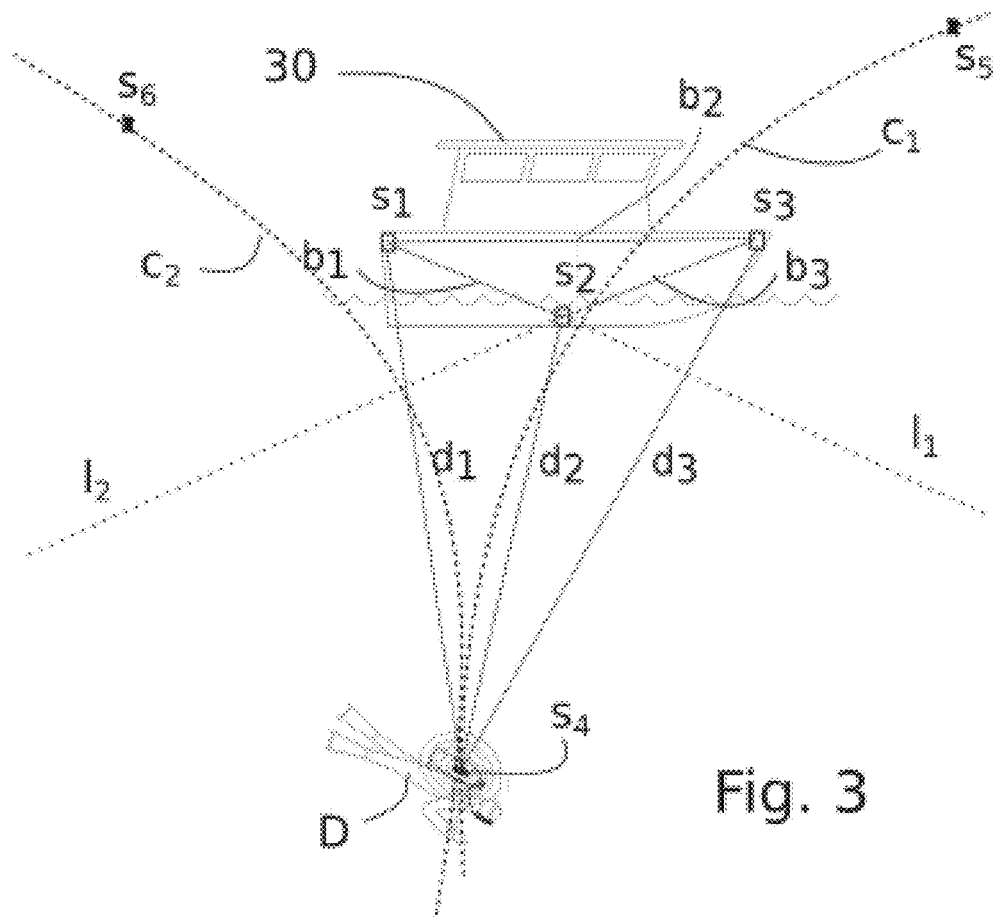
Figure 5:
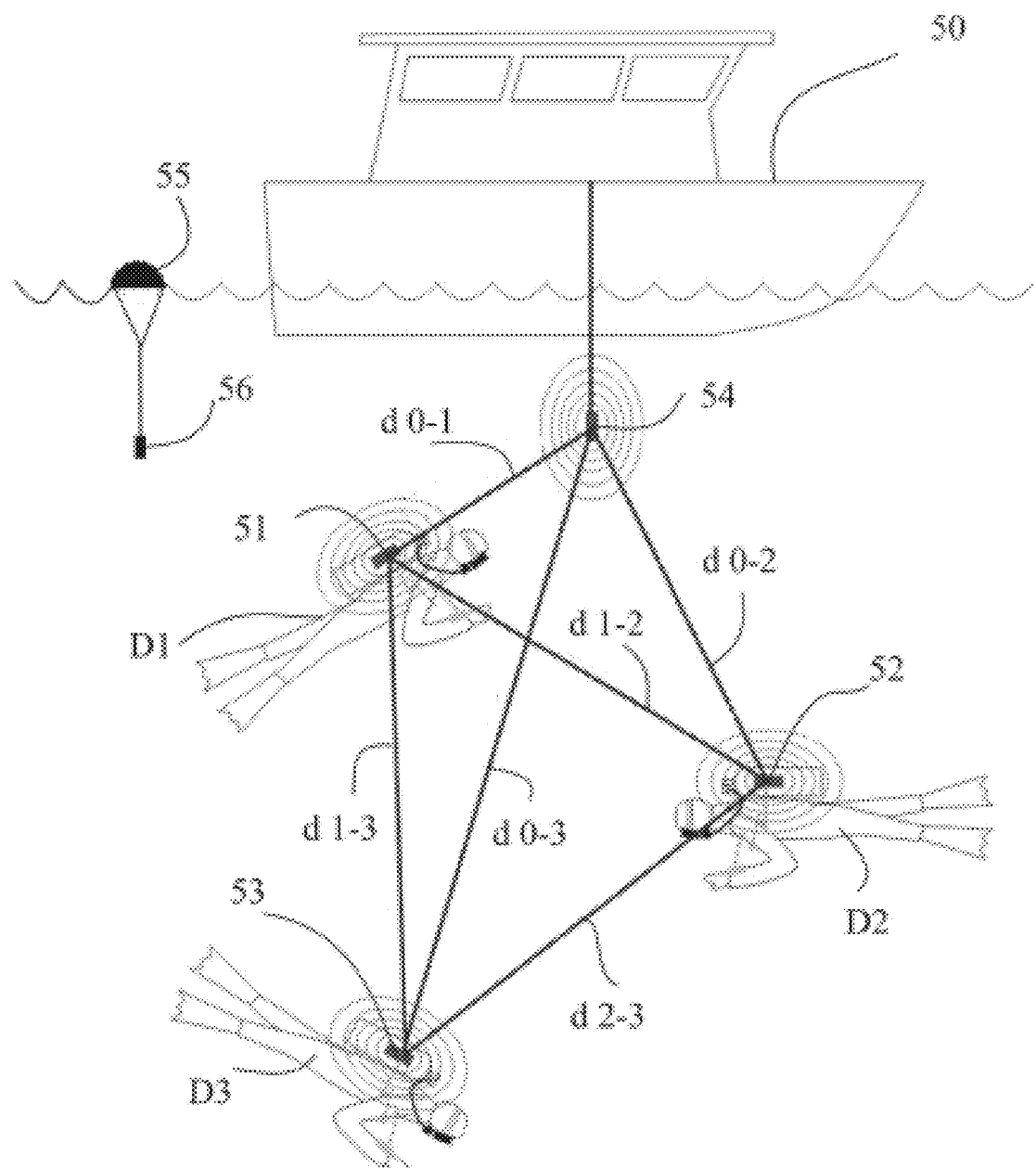
Figure 6:
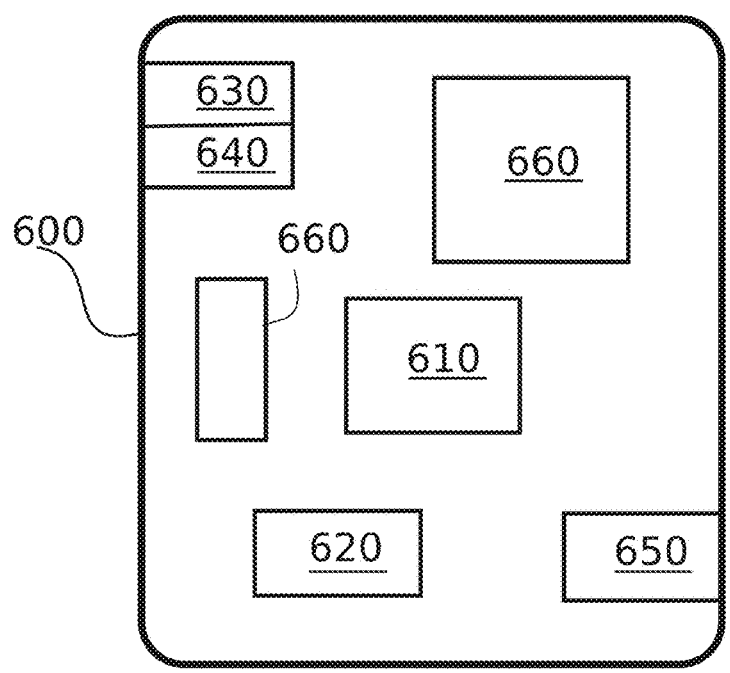

FIG. 1 shows a processing unit;
FIG. 2 shows an example of distance measurement;
FIG. 3 shows triangulation for determining a position;
FIGS. 4A-4C shows embodiments of the invention;
FIG. 5 shows a further embodiment of the invention.
FIG. 6 illustrates an example apparatus capable of supporting at least some embodiments of the present invention.

DETAILED DESCRIPTION OF THE INVENTION

FIG. 1 illustrates an example of a modern processing unit 100 having a microcontroller or processor 110 which comprises at least one processor core. The processor has a number of peripherals, such as user interfaces, sensors and displays. A user may interact with the device using the user interfaces, which may comprise buttons, for example. The processing unit 100 may comprise a connectivity function configured to communicate with a communications network, such as, for example, a wireless communications network.

Embodiments of the remote and wearable devices of the present invention may include similar devices like the one in FIG. 1, with modifications according to the invention in order to allow the devices and the applications running on them to communicate with each other. Basic communications need include synchronous operation in transmitting time-critical signals, if there are transceivers operating at a distance from each other. A master-slave configuration mechanism may be needed to set up a time scheme for orderly communication and signaling between all devices involved, if there are many of them. Also, triangulation and other distance and direction calculations may be done in all transceivers in a base station to which the information from the wearable devices flow in, but it need to be agreed which device is the master device that is sending out processed information to the wearable devices.

The illustrated processing unit may comprise a microcontroller or a microprocessor 110. In the case of a microcontroller it may comprise, for example, a Silabs EMF32, a Renesas RL78 or a Toshiba TLCS-870 microcontroller, or similar. In the case of a microprocessor, it may comprise for example a Qualcomm Snapdragon processor, an ARM Cortex-based processor and/or an Intel Atom processor. Processor 110 may be a single- or multi-core processor. A processing core may comprise, for example, a Cortex-A8 processing core manufactured by ARM Holdings or a Steamroller processing core produced by Advanced Micro Devices Corporation.

The processor 110 may also comprise at least one application-specific integrated circuit, ASIC, or at least one field-programmable gate array, FPGA. The processor 110 may constitute means for performing method steps in the processing unit 100 and may be configured, at least in part by computer instructions, to perform actions in the processing unit 100 or in a device being operated by the processing unit 100.

The processing unit 100 may be enabled to control a display 130 of the device via a display interface 112. The display interface 112 may comprise communication circuitry comprised in the processor 110. The processor 110 may be communicatively coupled, in the illustrated example, with an ultrasonic transducing unit 120, a vibrating or a buzzer unit 170, a universal serial bus (USB) interface 160, a pressure sensor 190, an acceleration sensor 1100, a gyroscope 1110, a magnetometer (compass device) 1120, satellite positioning circuitry 1130, a Bluetooth interface 1140, user interface buttons 1150 and a touch interface 1160. Pressure sensor 190 may comprise a depth gauge sensor, for example.

The processor 110 may also be communicatively coupled with a cellular interface 140 and a non-cellular wireless interface 150. Further examples of peripherals that may be coupled to the processor 110 include an external flash memory 1170, or a sensor hub 1180 containing or supporting several acoustic transducers, radio transceivers or other sensors. Such sensor hubs may include processors for providing ultrasonic or radio connectivity, or the hub may be connected e.g. to sensor devices 1190 having in-built connectivity.

In FIG. 1 are further illustrated a memory 180 which may be based on random access memory technology, such as DDR2 or DDR3, on pseudostatic random access memory technology such as SRAM, FLASH and/or FRAM for example.

Distance Measurement

In FIG. 2 is shown a practical example of the basic principle of distance measurement, as used in the present invention. A remote device, an ultrasonic or radio transducer in unit 210 generates a wave uw that propagates in the air or water in the direction of the arrow towards an ultrasonic or radio receiver in unit 220 of a wearable device. Ultrasound is known to propagate in water with a speed of something between 1480 and 1780 m/s, depending on water salinity and temperature. Radio waves, of course, propagate in the air with the speed of light. For a given water system and assuming normal diving conditions, the ultrasonic speed is easily found from the literature and may be assumed to be constant during a dive. For example, at 22° C., the ultrasonic speed in ocean sea water may typically be 1524 m/s and in sweet water 1478 m/s. By measuring the salt concentration C in grams/liter, the speed V is given by the formula V=0.94 C+1480.5 m/s. An ultrasonic transducer may be based on a piezoelectric element.

The distance L between the units 210 and 220 may then be calculated by recording the time point at which the signal is transmitted at 210, and recording when a response from unit 220 is received (time of transport). The total time T consists of t1+t2+t3. The internal processing time t3 of the wearable device is included in the response signal from unit 220 to unit 210. A processing unit in 210 can easily eliminate the effect of t3, and calculate the distance L=V*(T−t3)/2.

Alternatively, the distance between a remote device and a wearable device may be performed by sending a data signal from the remote device to a wearable device, and by determining the distance based on the signal strength of the response signal received from the wearable device. The processing unit needs to have stored in a memory unit a parameter representing the transmitting power of the transmitters of the wearable devices. The distance can then be calculated based on the attenuation of the received signal strength.

Determination of the Direction from a Remote Unit to a Wearable Unit

The direction from a remote unit, i.e. a diver's base, to a diver may be found by having at the base three ultrasonic sensors or transducers spaced apart, on a boat or on buoys, from each other. The location and distance of a diver can then be calculated by classic 3-D triangulation.

In FIG. 3 is shown an underwater situation covering one embodiment of the invention. A boat 30 is the base for a diver D. The boat has three ultrasonic transceivers $s_1$-$s_3$ as remote devices which communicates via ultrasonic signaling with the wearable ultrasonic transceiver device $s_4$ carried by the diver D. The distances $d_1$-$d_3$ from each respective sensor to the diver can be measured and calculated as described above in connection with FIG. 2. The distances $b_1$-$b_3$ and the mutual orientation between the transceivers $s_1$-$s_3$ are known. A compass device (not shown) keeps track of the turning movements of the base 30. This information is used to eliminate the effect of such movements in the geometry between the sensors $s_1$-$s_3$ on one hand and the sensor $s_4$ on the other hand.

The transceivers need not be integrated and combined transmitters and receivers, the may also be different devices. In fact, only one transmitter on the boat 30 is required that is in functional connection with a processing unit 100, which in turn are in functional connection with the receivers at locations $s_1$-$s_3$, for example. In such a case, the timing of the signal sent out from a single transmitter is recorded in by the processing unit 100, which also receives information about the time of any received signals from the receivers at $s_1$-$s_3$. Thus all information that is required for the determination of the distances d1-d3 can be gathered and processed.

In order to determine the direction of the diver D from the boat 30 by triangulation and the four sensors, the position of device $s_4$ need to be determined. The spatial location of the device $s_4$ is determined by the triangles $s_1$-$s_2$-$s_4$, $s_1$-$s_3$-$s_4$, and/or $s_2$-$s_3$-$s_4$. However, a solution based only on distances has a reflection or mirror point that fulfills the same geometrical criteria.

In order to eliminate the mirror solution, a circle $c_1$ is constructed in the plane of one of the triangles, here $s_1$-$s_2$-$s_4$, for example, with its center point (not shown) on the extension $l_1$ of the line between sensors $s_1$ and $s_2$. The radius of the circle $c_1$ is scaled so that its periphery crosses the point $s_4$ of the triangle $s_1$, $s_2$, $s_4$. As the mirror point $s_5$ on the circle fulfills the same criteria, the algorithm does not yet know which point is the correct one. Then a second circle $c_2$ is calculated in a similar manner in the plane of the triangle $s_2$-$s_3$-$s_4$, with its center point on the extension $l_2$ of the line between $s_2$ and $s_3$. The perimeter of $c_2$ is also set to also cross point $s_4$.

The direction to diver D is now unambiguously determined, as the mirror candidate points $s_5$ and $s_6$ are not equal, and can thus be eliminated.

If depth information is available (sent from the divers diving unit), two sensors are in principle enough. The depth of the diver will in this case tell which one of the points $s_4$ and $s_5$, for example, is valid. The only situation where the depth value of points $s_4$ and $s_5$ would be about the same, is when the boat sensors $s_1$-$s_3$ would be on about the same depth as the diver, which is highly unlikely to occur.

In other embodiments of the invention, rotating sensors may be used to determine the direction to a target. These involve measurement of the signal strength. With rotating sensors, the direction from which a received signal is strongest, is easy to determine. Thus two rotating sensors are sufficient to collect the information necessary for determining the direction to a diver, for example.

In further embodiments of the invention, sensor arrays may be used for determining the direction to a target. Sensor arrays may be a plurality of sensors arranged in a matrix, as a row or a circle, which are monitored in order to detect which sensors receive the strongest signal. The control system of such arrays may be configured to indicate the direction to the target based on a single measurement of an incoming signal.

As discussed above, antenna array arrangements may detect from which direction of an ultrasonic transmission, e.g. the highest amplitude is received, whereby at least an approximate direction to a diver can be determined. The accuracy of the direction to the diver depends on the diving circumstances, but using appropriate arrays of antennas (ultrasonic transducers) and direction of arrival (DOA) detection algorithms, a good estimation is obtainable. DOA algorithms are well known in this context, and classical Fast Fourier Transform techniques, Pisarenko Harmonic Decomposition (PHD), Multiple Signal Classification, and eigenvector methods may be mentioned here. The processing unit of FIG. 1 may then assign a direction to the distance value of the diver, and in case of several divers, to determine the location of each diver.

In FIG. 4A is shown some embodiments of the invention, where direction-sensitive remote devices 41 and 42 are used on a boat 40. The position of the wearable device $s_4$ on the diver D is determined by the two three-dimensional directions vectors r1 and r2. The position of the diver D is in their crossing point. In FIG. 4B is also shown the principle of signal strength measuring and direction determination based on that. Sensors $s_x$-$s_{x+1}$ receive a signal from the transmitter of the device $s_4$ with a different strength depending on their position relative to diver D. The sensor $s_{x+m}$ receiving the strongest signal or amplitude at x, carries the information of the direction to the diver. The two-dimensional view in FIG. 4A is easily expanded to 3D with rotating sensors receiving signals from all directions, or by using two or 3D (e.g. arranged as a hemisphere) sensor arrays, as described above.

In FIG. 4C is shown the concept of a ring-shaped sensor array 43, capable of detecting in two dimensions the direction of an incoming signal 45 from a wearable unit. The array 43 consists, in this exemplary case, of twelve signal direction sensitive receivers or sensors 44a-44l, each with a detection angle α. Here, the sensor 44l receives the strongest signal and is given most weight in the direction finding calculation, while the neighboring receivers 44k and 44a contribute to the final direction indication based on their received signal strengths. A rotating sensor would act in a similar fashion, with the difference that the detection points 44a-44l have a slight time offset due to the delay caused by the rotational movement R of a device 43 having instead of twelve, only one or a few sensors 44. A minimum of two, but in fact any desired number of sensors 43 arranged in desired angles to each other, may be combined to form one 3D sensor capable of accurate detection of the direction to the wearable device $s_4$.

One of the main advantages of the inventive arrangement is that the wearable device, i.e. a diver unit, can be made with one single antenna. In this way, the units can be made small and energy efficient. Preferably, a diver unit is integrated into a dive computer or in a dive computer's tank pressure sensor unit.

Distance and Direction from Diver to Diver

In FIG. 5 is shown a situation where a boat 50 is the base for a team of three divers D1, D2 and D3. According to some embodiments, the boat may have underwater transceivers 54, 56, as many as required, hanging from the boat and/or from a separate buoy 55. As described in connection with FIG. 3, the transceivers communicate via ultrasonic signaling with the diver units 51, 52 and 53, carried by each diver D1-D3 respectively. The distance and direction vectors d0-1, d0-2 and d0-3 from unit 54 to each of the divers can be calculated as described above in connection with FIGS. 2, 3, 4A, 4B and 4C. Here, in reference symbols d0-1, d0-2 and d0-3, 0 stands for the beacon 54 and the numbers 1-3 for each diver D1-D3, respectively. In the following, the communication for the diver-to diver data is for clarity described as being taken place through unit 54 only, but it is clear that any unit 54, 56 could perform similarly, or that several transceivers could do it in parallel to improve the range and signal quality for distant divers.

In some embodiments, the processing unit of FIG. 1 may assign a location vector d 0-1, d 0-2 and d 0-3 to each diver. The location may be verified or supplemented by depth data sent from the diver units. The location information thus forms three-dimensional distance vectors to each diver D1-D3, which is communicated to each diver units 51-53. From this information, the processing unit in each diver unit may calculate the relative distance and direction from any diver to any fellow diver. For example, when the distance vectors d 0-1, d 0-2 and d 0-3 from the transceiver to each diver are known, the distance vectors d 1-2, d 2-3 and d 1-3 between any two divers can be calculated by ordinary vector subtraction. For example, vector d23 from diver D3 to diver D2 is a result of the subtraction of vectors d03-d02, and may be displayed to diver D3 for easy orientation to diver D2, if needed In this way, without any further signaling between the divers and the transceiver 54 and without any location measurements required to be done in the diver units, the transceiver 54 or a processing unit of each diver unit 51-53 may calculate the distance and direction to between any divers in a diving team D1-D3, and display such information to any diver. Preferably, the divers are all equipped with compass devices, which makes it easy determine in which direction to swim to find any of the fellow divers.

Determining the Movement Direction of a Diver

The direction of movement of a diver may easily be determined by repetitive distance measurements and applying to the results any diver position calculating method as described above. The difference in the position data will tell the system in which direction the diver is swimming or moving. The system may set alarms, if a diver is moving out of range of the ultrasonic communication system, for example. Also other alarm limits may be set by the system, such as time of dive, tank pressure etc. An exceeded alarm limit may cause the system to issue a warning or emergency message to all divers.

In some embodiments, the speed and direction of a diver is known by other means, e.g. using 6DOF (Degrees Of Freedom) orientation sensors, pressure-gradient or thermal-gradient speed sensors in the wearable device. In such cases, the information is transmitted to the remote unit, combined with the position data of the diver, and distributed to the other divers as described above.

Communication Aspects

In general, a transceiver in the context of the present invention should have a capability to listen to signals of other transmitting devices. In such cases, the transceiver devices may self-adjust their communication timing scheme based on signals of similar devices. Sending data only as a response to a request is a feature that helps to overcome problems with reflected signals and/or overlapping signals. As a further feature to this end, the inventive system may in some embodiments include predetermined and different time delays for each user. The time delays may be factory set or adjustable on each wearable unit, whereby it is possible to take into account the number of players, divers and other circumstances. In some embodiments, the time delay information unique to each wearable unit may also constitute the identification data for the unit. Predefined and different time delays for each wearable unit should guarantee that a broadcast from a remote unit 54 or 56 is replied to in an orderly manner from each wearable unit without collisions.

Alternatively, there may in some embodiments be a master device, which controls some or all of the devices. The master is configured to listen to data packets sent by other devices, and may assign time slots to other devices based on the availability of free time slots in the scheme. Such timing scheme may resemble the well-known time division multiplex access (TDMA) scheme, for example. A signal may then comprise data packets successively ordered in consecutive time slots with a time margin between the data packets to ensure that there is no overlap of data packets.

When a remote unit 54 or 56 send out messages which include a reply message request from all or any of the wearable units 51-53, whether by broadcast or individually addressed, each wearable unit will send in response a data packet with identification data (ID) and time delay data. The time delay data is the time difference between the time stamp of a received signal and the time stamp of the sent response signal, as discussed in connection with FIG. 2.

The inventive system is also easily adapted to changes "on the fly". If a new player or diver enters the team, the newcomer is simply identified by the ID of the wearable unit he or she is carrying, and added to the team. If a team member leaves the team, the reverse happens. All team members may be notified by a message sent form the remote unit regarding changes in the team.

In this way, the transceiver 54 administers the traffic in order to make sure communication takes place without collisions and errors. The wearable units may send useful data to the transceivers 54, 56, such as depth of the diver in question, the current tank pressure and the average air consumption during the last few minutes, for example. High air consumption correlates usually with low experience or a high stress condition, and may cause the remote unit to follow a diver more frequently, or to trigger an alarm.

Radio Over Air

According to some embodiments of the inventive method and system, first and second wireless communication means of the remote device and the wearable device respectively, are radio transceivers. Thus the remote device comprise a receiver being capable of receiving radio signals from the wearable device and to determine its distance and direction, and the wearable device may have similar communication capabilities. Thus, the remote and/or the wearable devices may be smartphones or smartwatches provided with appropriate software that implement the invention. The wearable devices may also be autonomous transceivers that can be fastened to sport gear, to a car, or placed on a fixed location on a playground.

The distance between two transceivers units in a radio technology variant of the present invention may be calculated in the same way as with ultrasonic waves, based on time of transport. The direction from a remote or base unit to a wearable device may thus be calculated by triangulation or by using sensors or sensor arrays capable of identifying the direction of an incoming signal based on signal strength.

Inventive systems in this regard are potentially very useful in monitoring and performing playfield activities, i.e. games. As many playfields have a level surface, the direction vectors between different units are in practice two-dimensional, which further may simplify the devices. Game analysis (e.g. football) and games in darkness (e.g. paintball) are examples of possible applications of the present invention.

Radio transceivers may thus form a network where all participants or players are mapped in real time on the playfield. They may see each other on a display of their wearable device and act accordingly. Depending on the sport or game, post-processing of data, e.g. for studying the realization of a planned tactics, may become an important aspect. The wireless communication protocol may be one used for communication between computers, and/or between any remote sensors, such as a Bluetooth LE or the proprietary ANT+ protocol. These are using direct-sequence spread spectrum, DSSS, modulation techniques and an adaptive isochronous network configuration, respectively. Enabling descriptions of necessary hardware for various implementations for wireless links are available, for example, from the Texas Instrument'S® handbook "Wireless Connectivity" which includes IC circuits and related hardware configurations for protocols working in sub-1- and 2.4-GHz frequency bands, such as ANT™, Bluetooth®, Bluetooth® low energy, RFID/NFC, PurePath™ Wireless audio, ZigBee®, IEEE 802.15.4, ZigBee RF4CE, 6LoW-PAN, Wi-Fi®.

FIG. 6 illustrates an example apparatus capable of supporting at least some embodiments of the present invention. Illustrated is a wearable device 600, which may comprise, for example, a processing unit with the specifications and capabilities as explained in FIG. 1. Comprised in device 600 is processor 610, which may be similar to the processor 110 of FIG. 1. The device 600 may comprise a memory unit 620 for storing information and/or computer instructions that processor 610 is configured to execute. When computer instructions configured to cause processor 610 to perform certain actions are stored in memory unit 620, and device 600 overall is configured to run under the direction of processor 610 using computer instructions from memory unit 620, processor 610 and/or its at least one processing core may be considered to be configured to perform said certain actions.

Memory unit 620 may comprise random-access memory and/or permanent memory. Memory unit 620 may comprise at least one RAM chip. Memory unit 620 may comprise solid-state, magnetic, optical and/or holographic memory, for example. Memory unit 620 may be at least in part accessible to processor 610. The memory unit 620 may be at least in part comprised in processor 610, and/or may be at least in part external to device 600 but accessible to device 600.

The wearable device 600 may comprise a transmitter 630 and a receiver 640, or they may form a combined transceiver unit. Transmitter 630 and receiver 640 may be configured to transmit and receive, respectively, information in accordance with at least one ultrasonic standard or proprietary standard. Transmitter 630 may comprise more than one transmitter. Receiver 640 may comprise more than one receiver. Transmitter 630 and/or receiver 640 may also be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 600 may comprise a near-field communication, NFC, transceiver 650. NFC transceiver 650 may support at least one NFC technology, such as NFC, Bluetooth, Wibree or similar technologies. Device 600 may comprise user interface, UI, 660. UI 660 may comprise at least one of a display, a keyboard, a touchscreen, a vibrator arranged to signal to a user by causing device 300 to vibrate, a speaker and a microphone. A user may be able to operate device 300 via UI 360, for example to manage diving or sports activity sessions.

Device 600 may also comprise a magnetometer or compass device 670, which gives to the processor 610 an indication of the magnetic north, which may be displayed as such, or being processed into a bearing to another wearable device on a display in the user interface 660.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for determining the distance to and position of devices communicating with each other over a medium, the system, comprising:
   at least one remote device comprising a first processing unit, at least one transmitter functionally connected to the first processing unit and adapted to transmit signals over a medium, and at least one receiver functionally connected to the first processing unit and adapted to receive signals over said medium,
   at least two wearable devices, each comprising a second processing unit and a wireless communication means capable of receiving and sending data signals over said medium, wherein
   said remote device is adapted to:
      measure the distance to at least two wearable devices,
      determine the direction to said at least two wearable devices based on at least two different bearings taken from said at least one remote device to each wearable device,
      calculate the position of said at least two wearable devices relative to the remote device;
      communicate said relative positions of at least a first wearable device and a second wearable device to the second wearable device;
   said second wearable device being adapted to
      process the relative position of said first wearable device and the relative position of said second wearable device in said second processing unit in order to calculate an indication of direction and distance from said second wearable device to said first wearable device and to present the indication to a user of said second wearable device.

2. The system according to claim 1, wherein said remote device is adapted to store the time when sending a data signal over said medium and to determine the distance to said wearable devices based on the time of travel of signals between the devices.

3. The system according to claim 1, wherein said remote device is adapted to send a data signal over said medium to said wearable devices and to determine the distance to said wearable devices based on the signal strength of the response signals received from said wearable devices.

4. The system according to claim 1, wherein said remote device is adapted to determine the direction to said wearable devices based on the intersection point of at least two different bearings taken from said remote device to each wearable device.

5. The system according to claim 1, wherein said remote device is adapted to determine the direction to said wearable devices based on at least two different bearings to each wearable device taken by at least two receivers functionally coupled to the processing unit of the remote device.

6. The system according to claim 5, wherein said at least two receivers are spaced apart from each other and are signal direction sensitive.

7. The system according to claim 1, wherein the at least one receiver comprises a rotating direction sensitive sensor.

8. The system according to claim 1, wherein a data signal transmitted from said remote device to said wearable device comprise an identification code by which a wearable device identifies itself as the recipient of said data signal.

9. The system according to claim 1, wherein a data signal transmitted from said wearable device to said remote device comprise an ID code by which a wearable device identifies itself as the transmitter of said data signal.

10. The system according to claim 9, wherein the ID code of said wearable device is a predetermined time delay that must pass between receiving data and sending a response.

11. The system according to claim 1, wherein signals transmitted from said remote device to a plurality of wearable devices comprise data on the position of the wearable devices, whereby each of said plurality of wearable devices is configured to calculate and display the direction and distance to any other said wearable device.

12. A method for determining the distance to and position of devices communicating with each other over a medium, comprising the steps of:
providing a at least one remote device and at least two wearable devices, each device comprising a processing unit and wireless communication means functionally adapted to transmit and receive signals over said medium, the method comprising in said remote device the steps of:
measuring the distance to at least two wearable devices,
determining the direction to said at least two wearable devices based on at least two different bearings taken from said at least one remote device to each wearable device,
calculating the position of said at least two wearable devices relative to the remote device;
communicating said relative position of at least a first wearable device and a second wearable device to the second wearable device; and
relative position of said first wearable device and the relative position of said second wearable device in said second wearable device in order to calculate an indication of direction and distance from said second wearable device to said first wearable device and to present it to a user of said second wearable device.

13. The method according to claim 12, wherein the step of determining the distance to said wearable devices is performed by storing the time when sending a data signal over said medium and to determine the distance to said wearable devices based on the time of travel of signals between the devices.

14. The method according to claim 12, wherein the step of determining the distance to said wearable devices is performed by sending a data signal from said remote device to said wearable devices over said medium and by determining the distance to said least two wearable devices based on the signal strength of the response signals received from said wearable devices.

15. The method according to claim 12, wherein the step of determining the direction to said wearable devices is based on the intersection point of at least two different bearings to each wearable device taken from said remote device to each wearable device.

16. The method according to claim 12, wherein the step of determining the direction to said wearable devices is based on at least two different bearings to each wearable device taken by at least two receivers functionally coupled to the processing unit of said at least one remote device.

17. The method according to claim 16, wherein the direction to said at least two wearable devices are based on bearing taken from two signal direction sensitive receivers being spaced apart from each other.

18. The method according to claim 12, wherein said remote device is determining the direction to said at least two wearable devices by using at least one receiver with a rotating direction sensitive sensor.

19. The method according to claim 12, wherein an identification code by which a wearable device identifies itself as the recipient of a data signal transmitted from said remote device to said wearable device is included in said data signal.

20. The method according to claim 12, wherein an ID code by which a wearable device identifies itself as the transmitter of a data signal is included in said data signal transmitted from said wearable device to said remote device.

21. The method according to claim 20, wherein the ID code of said wearable device is used a predetermined time delay that must pass between receiving data and sending a response.

22. The method according to claim 12, wherein data on the position of each wearable device is included in the signals transmitted from said remote device to a plurality of wearable devices, whereby each of said plurality of wearable devices calculates and displays the direction and distance to any other said wearable device.

23. A positioning device for determining the distance to and position of two or more wearable devices communicating with said positioning device and each other over a medium, comprising:
a processing unit, at least one transmitter functionally connected to said processing unit and adapted to transmit signals over a medium, at least one receiver functionally connected to said processing unit and adapted to receive signals over said medium, and
a memory unit for storing data;
said processing unit is configured to measure the distance to said wearable devices;
said processing unit is configured to determine the direction to said wearable devices based on at least two different bearings taken from said positioning device to each of the wearable devices, and to calculate the position of said wearable devices relative to the positioning device; and said positioning device is configured to communicate said relative positions of at least a first wearable device and a second wearable device of said wearable devices to at least said second device of said wearable devices for processing said relative positions to obtain an indication of direction and distance from said second wearable device to said first wearable device.

24. The positioning device according to claim 23, wherein said processing unit is configured to store in said memory unit the time when a data signal sent over said medium, to receive a return signal sent from said wearable devices in response to said data signal and to register the time of arrival of said response, and to determine the distance to said wearable devices based on the time of travel of signals between said positioning device and each of said wearable devices.

25. The positioning device according to claim 23, wherein said processing unit is configured to store in said memory unit as a given parameter the transmitting power of the transmitters of said wearable devices, and to determine the distance to said wearable devices based on the signal strength of the response signals received from said wearable devices.

26. The positioning device according to claim 23, wherein said processing unit is configured to determine the direction to said wearable devices based on the intersection point of at least two different bearings taken from said positioning device to each of the wearable devices, and to calculate the position of said wearable devices relative to the positioning device.

27. The positioning device according to claim 23, wherein said processing unit is configured to determine the direction to said wearable devices based on at least two different bearings to each wearable device taken by at least two receivers functionally coupled to the processing unit of said positioning device.

28. A wearable device comprising a processing unit and a wireless transceiver unit, and being adapted for communication with a remote positioning device capable of measuring distances and directions to said wearable device and to at least one other wearable device over a medium in order to calculate the positions of said wearable devices relative to the remote device, wherein said transceiver unit is configured to receive data signals from said remote positioning device and to respond to them, and wherein said processing unit is further configured to process said relative position data to said positioning device and relative position data of said positioning device to at least one other wearable device received from said positioning device, and to present to the user of the device an indication of direction and distance to said other wearable device.

* * * * *